United States Patent [19]

Finley et al.

[11] Patent Number: 5,163,272

[45] Date of Patent: Nov. 17, 1992

[54] PROTECTIVE EAR CANAL COVERING FOR DOGS AND OTHER ANIMALS

[76] Inventors: John G. Finley, P.O. Box 1692; Mary F. Harris, P.O. Box 1917, both of Ramona, Calif. 92065

[21] Appl. No.: 815,135

[22] Filed: Dec. 27, 1991

[51] Int. Cl.⁵ .................................................. B68C 5/00
[52] U.S. Cl. .................................................. 54/80.1
[58] Field of Search ..................................... 54/80, 81

[56] References Cited

U.S. PATENT DOCUMENTS

| | | |
|---|---|---|
| 243,409 | 6/1881 | Speer . |
| 382,668 | 5/1888 | Sullivan et al. ........................ 54/80 |
| 584,506 | 6/1897 | Harriss . |
| 669,909 | 3/1901 | Young . |
| 1,004,507 | 9/1911 | Walz . |
| 2,136,115 | 11/1938 | McCaleb ................................ 54/80 |
| 2,280,668 | 4/1942 | Sherlock . |
| 2,784,409 | 3/1957 | Slipakoff . |
| 2,869,132 | 5/1957 | Drummond . |
| 3,101,696 | 8/1963 | Lipman . |
| 3,753,334 | 8/1973 | Blessing ................................. 54/80 |
| 4,355,600 | 10/1982 | Zielinski .............................. 119/143 |
| 4,662,156 | 5/1987 | Oettel .................................... 54/80 |
| 5,031,388 | 7/1991 | Ode ....................................... 54/80 |

Primary Examiner—Robert P. Swiatek
Attorney, Agent, or Firm—Loyal M. Hanson

[57] ABSTRACT

A protective ear canal covering includes a piece of netting (e.g., a mosquito netting material, crinoline, or an other open weave fabric). The piece of netting has first and second chin-strap attachment regions and forward and rearward marginal edge portions extending between the first and second chin-strap attachment regions. The chin strap has first and second ends that are each attached to the netting at a respective one of the first and second chin-strap attachment regions. The piece of netting is so shaped and dimensioned to fit the head of a dog without covering the eyes of the dog that when the piece of netting is in place on the dog's head (a) the forward marginal edge portion extends across an upper portion of the dog's head and downwardly ahead of the ears, (b) the rearward marginal edge portion extends across the head behind the ears, and (c) the chin-strap attachment regions lie below the ear canals with the netting covering the external ears and the ear canals. The chin strap extends under the dog's chin and holds the marginal edge portions and the chin-strap attachment regions of the netting lightly against the dog's head. The netting and chin strap may be suitably sized for other animals.

3 Claims, 1 Drawing Sheet

PROTECTIVE EAR CANAL COVERING FOR DOGS AND OTHER ANIMALS

BACKGROUND OF THE INVENTION

1. Technical Field

This invention relates generally to accessories for domestic animals, and more particularly to an ear canal covering that protects against such things as foxtails and burrs lodging in the animals' ears.

2. Background Information

The term "foxtail" refers to any of several grasses with spikes that resemble small brushes. It is sometimes used to refer to the individual spikes too. Each spike houses a seed that nature has outfitted with barbs. The barbs stick to passersby and that carries the seed away to germinate elsewhere.

Dog owners know foxtails well. It only takes a short exercise session in a grassy field for a dog to carry away its share. The foxtails lodge painfully in the dog's paws, nostrils, and ear canals. So, the owner must remain alert for their presence and remove them promptly.

Those lodging in the ear canals are particularly troublesome. They remain less visible while irritating a very sensitive region. Dog attempts to scratch them free only lodge them deeper. The dog is left whining in pain and so the owner must patiently calm the dog while carefully inserting a tweezers down the ear canal far enough to remove the offending foxtail.

Although some sort of protective dog garment might alleviate the problem, existing ear coverings such as the garment for long-eared dogs described in U.S. Pat. No. 2,136,115 are not entirely effective. They are designed to protect the pinnae of long-eared dogs from mud, burrs, and so forth. The pinnae are just the projecting cartilaginous portions of the external ears. Foxtails can still find their way into the ear canals.

In addition, many dogs seem to object to wearing such a garment. They paw it off or hook it on a nearby object and tear it off. So dog owners need an effective way to protect against such things as foxtails lodging in their dogs' ears.

SUMMARY OF THE INVENTION

This invention protects against foxtails, burrs, and the like, as well as chiggers, ticks and so forth, by providing a protective ear canal covering constructed largely of netting (e.g., a mosquito netting material, crinoline, or an other open weave fabric). The netting is configured to extend over the dog's head and ears. A small chin strap holds it lightly against the sides of the head below the ear canals.

The netting keeps foxtails out, and dogs find the netting and the way it is arranged very acceptable. They seem to like it, wearing it proudly during their daily activites and sleeping with it on overnight. Thus, the ear canal covering of this invention alleviates the problems outlined above to provide effective foxtail protection.

Generally, a protective ear canal covering constructed according to the invention includes a piece of netting material outfitted with a chin strap. The piece of netting includes forward and rearward marginal edge portions. They extend between first and second chin-strap attachment regions on the piece of netting where the ends of the chin strap are attached.

The piece of netting is shaped and dimensioned to fit a dog's head without covering the eyes. Once in place on the dog's head (a) the forward marginal edge portion extends across an upper portion of the dog's head and downwardly ahead of the ears, (b) the rearward marginal edge portion extends across the head behind the ears, and (c) the chin-strap attachment regions lie below the ear canals with the netting covering the external ears and the ear canals. Meanwhile, the chin strap extends under the dog's chin between the two chin-strap attachment regions, thereby holding the marginal edge portions and the chin-strap attachment regions of the netting lightly against the dog's head.

The netting is noticeably dog-acceptable. It is lightweight and flexible. It has little bulk and stiffness to irritate the dog. It does not bind the dog's ears objectionably. In addition, it allows better passage of air than many other materials; heat does not accumulate. The netting also allows better passage of sound; dogs are less concerned with its presence. Furthermore, the netting does not rustle annoyingly like some fabrics, and the chin strap combines with the rearward marginal edge of the netting to present a familiar collar-like sensation to the dog. So, dogs readily accept the protective ear canal covering of this invention and wear it willingly.

The foregoing and other objects, features, and advantages of the invention will become more apparent upon reading the following detailed description with reference to the illustrative drawings.

DESCRIPTION OF THE PREFERRED EMBODIMENTS

Figure 1:
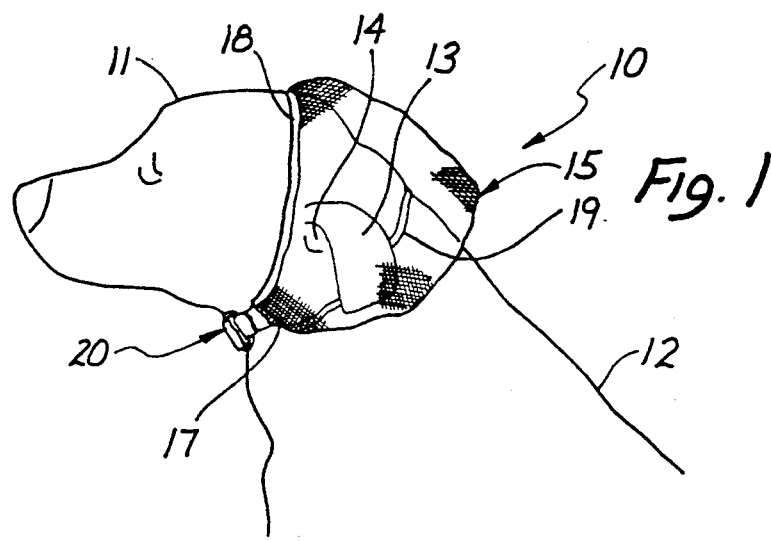
FIG. 1 of the drawings is a pictorial view of a dog wearing an ear canal covering constructed according to the invention.

The drawings show a protective ear canal covering 10 constructed according to the invention. It is illustrated in place on the head 11 of a dog 12. There, it extends over the pinnae 13 and ear canals 14 to provide effective protection.

Generally, the covering 10 includes a piece of netting 15 having first and second chin-strap attachment regions 16 and 17 and forward and rearward marginal edge portions 18 and 19 that extend between the first and second chin-strap attachment regions. The piece of netting 15 is composed of a mosquito netting material, crinoline material, or other open weave fabric having spaces large enough to allow free passage of air and sound but small enough to prevent foxtails from passing through. Although preferably a single piece of netting, the piece of netting 15 may include one of more individual pieces of netting as long as they are attached together in such a way that the piece of netting 15 is mostly netting.

The piece of netting 15 is shaped and dimensioned to fit on the head 11 of the dog 12 without covering the dog's eyes. With the piece of netting 15 in place on the dog's head, and the dog's head generally erect as illustrated in FIG, 1, the forward marginal edge portion 18 extends across an upper portion of the dog's head and downwardly ahead of the ears. In addition, the rearward marginal edge portion 19 extends across the head behind the ears—across what may be referred to as a rearward portion of the head 11 or an upper neck portion of the dog. With the piece of netting 15 in that position, the chin-strap attachment regions 16 and 17 lie below the ear canals 14 (i.e., lower than the entrance to the ear canals) with the netting covering the pinnae 13 and the ear canals 14 (i.e., extending over the entrance to the ear canals). That protects against foxtails and so forth entering the ear canals.

A chin strap 20 with first and second ends 21 and 22 attached to the netting at the first and second chin-strap attachment regions 16 and 17 holds the piece of netting 15 on the head of the dog 12. The chin strap 20 is shaped and dimensioned to extend under the dog's head—in a position that may be described as under the dog's chin. There, it holds the marginal edge portions 16 and 17 and the chin-strap attachment regions 18 and 19 of the netting 15 lightly against the dog's head.

Figure 2:
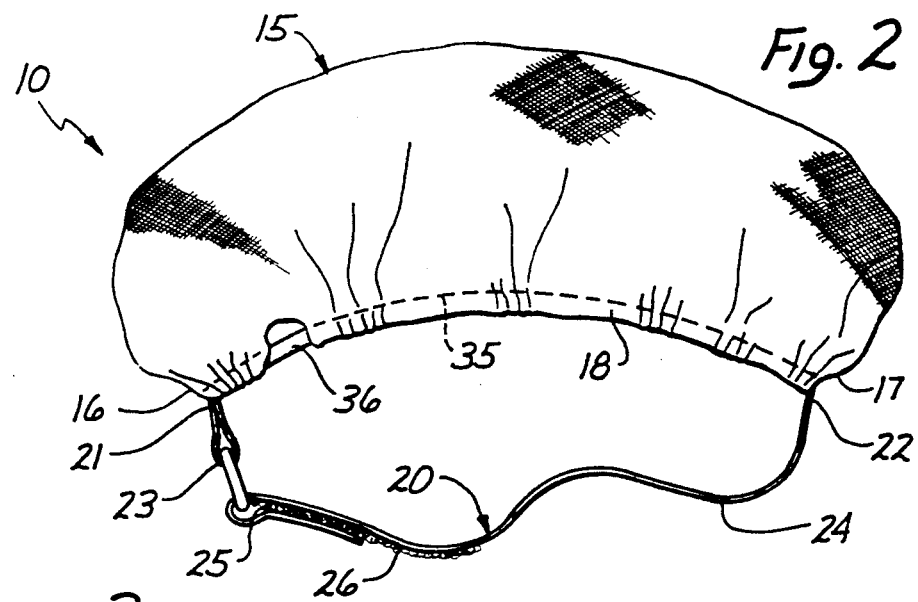
FIG. 2 is an enlarged pictorial of just the ear canal covering.

The chin strap 20 includes a first section 23 and a second section 24 that a dog owner can adjustably couple together. A hook-and-loop-type fabric fastener such as that available under the trademark VELCRO may be used. The second section 24 of the illustrated chin strap 20 includes a hook component 25 and a loop component 26 for that purpose (FIG. 2). Of course, any of various other suitable coupling arrangements may be used, such as a buckle arrangement or even a chin strap configured with two sections that tie togeher.

Figure 3:
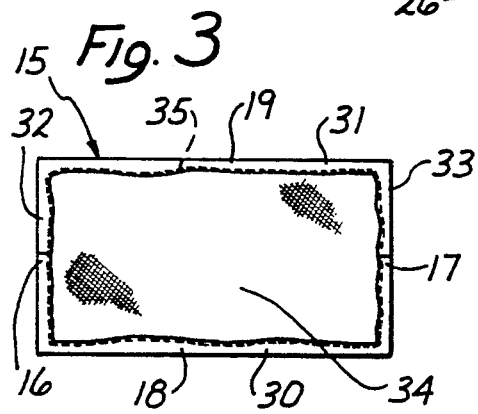
FIG. 3 is a plan view of a piece of mosquito netting used in making the ear canal covering.
Figure 4:
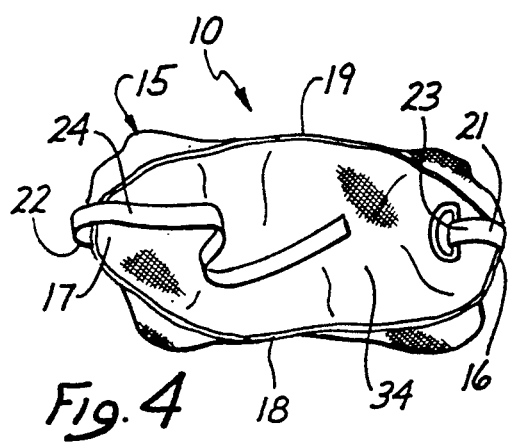
FIG. 4 is another view showing the piece of netting after an elastic band and a chin strap are added.

FIGS. 3 and 4 illustrate further details of construction. Preferably, the piece of material 15 takes the form of a generally rectangular piece of material having opposite sides 30 and 31, opposite ends 32 and 33, and a midportion 34 (FIG. 3). The sides and ends are folded (FIG. 3) and secured by suitable means such as stitching 35 (FIGS. 2 and 3) to form a channel for an elastic band 36 (FIG. 2). The elastic band 36 is threaded through the channel and secured at the first and second chin-strap attachment regions 16 and 17 by additional stitching so that the marginal edge portions 18 and 19 are slightly gathered.

Next, the chin-strap attachment regions 16 and 17 are gathered so that the marginal edge portions 18 and 19 converge at the chin strap attachment regions. Then, the first and second ends of the chin-strap 20 are attached at the chin-strap attachment regions by suitable means such as stitching. That results in the finished covering 10 (FIGS. 1, 2, and 4). The elastic band 36 can stretch somewhat in holding the covering against a dog's head, while the midportion 34 remains somewhat full and loose.

Thus, the invention protects against foxtails, burrs, and the like, as well as chiggers, ticks and so forth, by providing a protective ear canal covering constructed largely of netting. The netting is noticeably dog-acceptable. It is lightweight and flexible. It has little bulk and stiffness. It allows better passage of air. It allows better passage of sound. It does not rustle annoyingly, and the chin strap combines with the rearward marginal edge of the netting to present a familiar collar-like sensation to the dog.

Although an exemplary embodiment has been shown and described, many changes, modifications, and substitutions may be made by one having ordinary skill in the art without necessarily departing from the spirit and scope of the invention.

What is claimed is:

1. A protective ear canal covering, comprising:
   a piece of netting having first and second chin-strap attachment regions and forward and rearward marginal edge portions extending between the first and second chin-strap attachment regions:
   means in the form of a chin strap for securing the piece of netting on the head of a dog, the chin strap having first and second ends that are each attached to the netting at a respective one of the first and second chin-strap attachment regions; and
   a single elastic band attached to the piece of netting at the chin-strap attachment regions and arranged to extend along both the forward and rearward marginal edge portions;
   the piece of netting being so shaped and dimensioned to fit the head of a dog without covering the eyes of the dog that when the piece of netting is in place on the dog's head (a) the forward marginal edge portion extends across an upper portion of the dog's head and downwardly ahead of the ears, (b) the rearward marginal edge portion extends across the head behind the ears, and (c) the chin-strap attachment regions lie below the ear canals with the netting covering the external ears and the ear canals; and
   the chin strap being shaped and dimensioned to extend under the dog's chin and hold the marginal edge portions and the chin-strap attachment regions of the netting lightly against the dog's head.

2. A protective ear canal convering, comprising:
   a piece of netting having first and second chin-strap attachment regions and forward and rearward marginal edge portions extending between the first and second chin-strap attachment regions; and
   means in the form of a chin strap for securing the piece of netting on the head of a dog, the chin strap having first and second ends that are each attached to the netting at a respective one of the first and second chin-strap attachment regions;
   the piece of netting being so shaped and dimensioned to fit the head of a dog without covering the eyes of the dog that when the piece of netting is in place on the dog's head (a) the forward marginal edge portion extends across un upper portion of the dog's head and downwardly ahead of the ears, (b) the rearward marginal edge portion extends across the head behind the ears, and (c) the chin-strap attachment regions lie below the ear canals with the netting covering the external ears and the ear canals; and
   the chin strap being shaped and dimensioned to extend under the dog's chin and hold the marginal edge portions and the chin-strap attachment regions of the netting lightly against the dog's head;
   wherein the piece of netting is gathered to converge at the chin-strap attachment regions.

3. A protective ear canal covering, comprising:
   a generally rectangular piece of netting having opposite forward and rearward sides, two opposite ends, a midportion intermediate the sides and ends, and first and second chin-strap attachment regions at the ends;
   an elastic band attached to the piece of netting at the chin-strap attachment regions and arranged to extend along the forward and rearward sides so that the piece of netting is slightly gathered along the forward and rearward sides; and
   means in the form of a chin strap for securing the piece of netting on the head of a dog, the piece of netting being gathered at the chin-strap attachment regions and the chin strap having first and second ends that are each attached to the netting at a respective one of the first and second chin-strap attachment regions;

the piece of netting being so shaped and dimensioned to fit the head of a dog without covering the eyes of the dog that when the piece of netting is in place on the dog's head (a) the forward side extends across an upper portion of the dog's head and downwardly ahead of the ears, (b) the rearward side extends across the head behind the ears, (c) the midportion extends loosely across the top of the head, and (c) the chin-strap attachment regions lie below the ear canals with the netting covering the external ears and the ear canals; and the chin strap being shaped and dimensioned to extend under the dog's chin and hold the forward and rearward sides and the chin-strap attachment regions of the netting lightly against the dog's head.

\* \* \* \* \*